3,064,058
METHOD OF PREPARING FLUORINATED COMPOUNDS

Bernard F. Duesel, Yonkers, Santo Emmanuele, New Windsor, and Richard G. Kadesch, Newburgh, N.Y., assignors to Nepera Chemical Co., Inc., Harriman, N.Y., a corporation of New York
No Drawing. Filed Apr. 7, 1961, Ser. No. 101,356
2 Claims. (Cl. 260—646)

The present invention relates to a method of preparing fluorinated compounds and relates in particular to a new and novel improvement in the method of replacing the chlorine substituent on chlorinated compounds with fluorine by reaction with an alkali metal fluoride.

Aromatic and heterocyclic fluorinated compounds of the benzene, naphthalene and pyridine series are valuable chemical intermediates useful in many synthetic procedures. For example, the aromatic fluorinated compound p-nitrofluorobenzene is an intermediate in the production of p-fluoroaniline, a valuable starting material for the production of aniline dyes.

The preparation of such compounds from the corresponding chlorinated compounds by reaction with an alkali metal fluoride is a well-known procedure. G. C. Finger et al., J. Am. Chem. Soc. 78, 6034 (1956) describe such a reaction wherein potassium fluoride furnishes the source of the fluorine atom which replaces the chlorine substituent of the starting material. In the Finger et al. publication, dimethylformamide and dimethylsulfoxide are disclosed as solvents for the reaction. It is generally recognized that a completely anhydrous system must be used in this reaction. Finger et al. describe two methods of drying the potassium fluoride reactnat, either by grinding the solid material with the simultaneous application of heat to vaporize the water present, or, alternately, suspending the potassium fluoride in benzene, boiling the mixture to remove water as an azeotrope, then adding the reaction solvent and finally removing the excess benzene by distillation.

The method described by Finger et al. has not proven to be altogether satisfactory in practice. The various drying techniques are cumbersome and require many manipulative steps which add greatly to costs of manufacture. In addition, product yields are not at optimum levels. For example, the reaction of p-nitrochlorobenzene with potassium fluoride in the presence of dimethylsulfoxide yields only 72 percent of theory of the desired p-nitrofluorobenzene. Moreover, the use of dimethylsulfoxide is expensive since a considerable portion of the solvent is lost due to decomposition during the course of the reaction of the potassium fluoride with the chlorinated starting material.

Tetramethylene sulfone has been suggested as an alternate solvent in this reaction in an attempt to solve certain of the problems observed when dimethylsulfoxide is used. While tetramethylene sulfone is stable in the reaction mixture, its use has been observed to be attended with generally low yields of the fluorinated product.

It is, therefore, a primary object of the present invention to provide an improved method of reacting chlorinated compounds with potassium fluoride in the presence of tetramethylene sulfone wherein high yields of the fluorinated product are obtained.

Other objects and the advantages of the present invention will become apparent from the following detailed description.

We have now found that fluorinated compounds may be produced in high yields by the reaction of chlorinated compounds with an alkali metal fluoride in the presence of tetramethylene sulfone if the fluoride salt is first suspended in the tetramethylene sulfone solvent, the mixture then distilled until at least 5 percent of the solvent has been removed and the chlorinated compound to be reacted is then added to the suspension to initiate the reaction.

Our improved process is applicable to the conversion of chlorinated compounds of the benzene, naphthalene and pyridine series having an activated chlorine substituent to the corresponding fluorinated compounds. In compounds of the benzene and naphthalene series, a chlorine substituent is activated by the presence of one or more nitro groups located ortho or para or ortho and para to the chlorine atom. In pyridine compounds, a chlorine substituent in the 2 or 4 position is activated by the pyridine nitrogen. In either series, other substituents may also be present. Thus, our invention is useful in replacing with a fluorine atom the chlorine substituent in o-nitrochlorobenzene, p-nitrochlorobenzene, 2,4-dinitrochlorobenzene, 2-chloro-5-nitrotoluene, 2-chloro-3-nitrotoluene, 2-chloro-3,5-dinitrotoluene, 1-chloro-2-nitronaphthalene, 1-chloro-4-nitronaphthalene, 1-chloro-2,4-dinitronaphthalene, 2-chloropyridine, 4-chloropyridine, 2-chloro-5-nitropyridine, 2-chloro-5-methylpyridine, 2-chloro-5-ethylpyridine and the like. Our process is particularly useful in the preparation of p-nitrofluorobenzene from p-nitrochlorobenzene.

In accordance with the improved method of our invention the alkali metal fluoride to be used in the reaction, for example potassium or sodium fluoride, is suspended in the tetramethylene sulfone solvent. This suspension is then distilled, preferably under vacuum, for example, at a pressure of 100 millimeters of mercury, and distillation is continued until between about 5 and about 15 percent of the tetramethylene sulfone has been removed. To the resulting suspension the chlorinated starting material is then added and the reaction is carried out in the conventional way by the application of heat. The product is recovered from the reaction mixture at the conclusion of the reaction, which normally requires 10 to 15 hours, by conventional techniques of steam distillation and extraction, and the product is purified by vacuum distillation.

By use of our new and novel improvement, we have found that yields of fluorinated compounds in the order of 90 percent of theory are obtained. Thus, this method represents a marked improvement over methods heretofore known for producing such compounds.

The following examples are included in order further to illustrate the method of the present invention:

Example I 53.5 grams of potassium fluoride are suspended in 140 ml. tetramethylene sulfone and the mixture is distilled at 100 mm. of mercury until 14 ml. of tetramethylene sulfone distillate has been obtained. 125.5 g. of p-nitrochlorobenzene are added, the mixture is heated to 240° C. and is held at this temperature for 12 hours. The mixture is then steam distilled and the oily layer separated from the distillate. The aqueous layer is extracted with 200 ml. ether, the ether evaporated and the oily residue combined with the oily layer, to yield 100.5 g. p-nitrofluorobenzene (93.5% of theory).

Example II

The procedure of Example I is repeated, except that the step of distilling the potassium fluoride suspension in the tetramethylene sulfone is omitted. Potassium fluoride which has been dried in an oven for 8 hours at 220° C. is used. A yield of 47.3% of theory of p-nitrofluorobenzene is obtained.

The results of the foregoing examples illustrate the dramatic improvement obtained by use of our invention, in that yield of the product is doubled. Furthermore, the yield of 93.5% of theory represents a significant improvement over the 72% yield obtained in the prior art method where the unstable dimethyl sulfoxide is used as a solvent.

It is understood that the foregoing detailed description is given merely by way of illustration and that many variations may be made therein without departing from the spirit of our invention.

Having described our invention, what we desire to secure by Letters Patent is:

1. In a process of replacing an activated chlorine atom by fluorine in chlorinated derivatives of ring systems selected from the group consisting of benzene, naphthalene and pyridine by heating a mixture of said chlorinated derivative and an alkali metal fluoride in the presence of tetramethylene sulfone, the improvement which comprises suspending the alkali metal fluoride in said tetramethylene sulfone and distilling said suspension until about 5 to about 15 percent by weight of said tetramethylene sulfone together with the water present has been removed before the addition of said chlorinated derivative.

2. In the process of heating p-nitrochlorobenzene with potassium fluoride in the presence of tetramethylene sulfone to form p-nitrofluorobenzene, the improvement which comprises suspending potassium fluoride in tetramethylene sulfone and distilling said suspension until about 5 to about 15 percent by weight of said tetramethylene sulfone together with the water present has been removed before the addition of p-nitrochlorobenzene.

References Cited in the file of this patent

Broughton: "Technique of Organic Chemistry," vol. III (1950), published by Interscience Publishers, Inc., New York, pages 622 and 623 are relied upon.

Finger et al.: J. Am. Chem. Soc. 78, 6034–6036 (1956).

Hideo et al.: C.A. 53, 1850 (1959), "Acrylonitrile Copolymer Solution."